(12) United States Patent
Mabuchi et al.

(10) Patent No.: US 8,212,450 B2
(45) Date of Patent: Jul. 3, 2012

(54) GENERATOR INCLUDING AN ELECTRET MEMBER

(75) Inventors: Katsuji Mabuchi, Gifu (JP); Makoto Izumi, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 393 days.

(21) Appl. No.: 11/946,733

(22) Filed: Nov. 28, 2007

(65) Prior Publication Data
US 2008/0122313 A1    May 29, 2008

(30) Foreign Application Priority Data

Nov. 28, 2006 (JP) ................................. 2006-319883
Apr. 25, 2007 (JP) ................................. 2007-116164
Nov. 13, 2007 (JP) ................................. 2007-294782

(51) Int. Cl.
*H02N 1/00* (2006.01)
(52) U.S. Cl. ........................................ 310/309; 322/2 A
(58) Field of Classification Search .................. 310/309; 322/2 A
See application file for complete search history.

(56) References Cited

U.S. PATENT DOCUMENTS

| 7,525,205 | B2 * | 4/2009 | Mabuchi et al. | 290/1 R |
|---|---|---|---|---|
| 2004/0007877 | A1 * | 1/2004 | Boland et al. | 290/1 R |
| 2004/0016120 | A1 * | 1/2004 | Boland et al. | 29/886 |
| 2006/0113862 | A1 * | 6/2006 | Suzuki et al. | 310/309 |
| 2008/0048521 | A1 * | 2/2008 | Mabuchi et al. | 310/309 |
| 2008/0111444 | A1 * | 5/2008 | Mabuchi | 310/309 |
| 2008/0122313 | A1 * | 5/2008 | Mabuchi et al. | 310/309 |
| 2008/0258565 | A1 * | 10/2008 | Murayama et al. | 307/400 |
| 2009/0079295 | A1 * | 3/2009 | Naruse et al. | 310/300 |
| 2009/0085359 | A1 * | 4/2009 | Mabuchi et al. | 290/1 R |
| 2009/0108590 | A1 * | 4/2009 | Mabuchi et al. | 290/1 R |
| 2010/0072855 | A1 * | 3/2010 | Matsubara et al. | 310/300 |

FOREIGN PATENT DOCUMENTS

| JP | 58029379 | * | 2/1983 |
|---|---|---|---|
| JP | 02-219478 | A | 9/1990 |
| JP | 02219478 | * | 9/1990 |
| JP | 04-112683 | A | 4/1992 |
| JP | 10-174462 | | 6/1998 |
| JP | 2003-153557 | A | 5/2003 |
| JP | 2006-180450 | | 7/2006 |

OTHER PUBLICATIONS

Genda et al., "High Power Electrostatic Motor and Generator Using Electrets", 12th International Conference on Solid State Sensors, Actuator, and Microsystems, Boston Jun. 8-12, 2003.*

(Continued)

*Primary Examiner* — Karl Tamai
(74) *Attorney, Agent, or Firm* — Ditthavong Mori & Steiner, P.C.

(57) ABSTRACT

An electrostatic operating apparatus (electrostatic induction generator) includes a first substrate having a first electrode and a second electrode and set in a state where the first electrode and the second electrode are electrically separated from each other at least on the substrate and a second substrate including an electret member, wherein the first substrate and the second substrate are so provided as to be opposed to each other at an interval and so formed as to be movable relatively with each other, and at least one of the first electrode and the second electrode is so formed as to be capacitively coupled with the electret member.

8 Claims, 11 Drawing Sheets

OTHER PUBLICATIONS

Manual Translation JP 04-112683, Tomoki Funekubo, "Electrostatic Actuator", Apr. 14, 1992.*

Manual Translation, JP 02-219478, "Electret Generator", Sep. 3, 1990, Seiichi Iwamatsu.*

Arakawa et al., "Micro Seismic Power Generator Using Electret Polymer Film", 4$^{th}$ International Workshop on Micro and Nanotechnology for Power Generation and Energy Conversion Applications, Power MEMS 2004, Nov. 28-30, 2004, Kyoto, Japan.*

Tada, Yasufusa, "experimental characteristics of electret generator using polymer film electrets", Mar. 1992, Jpn. J. Appl. Phys. vol. 3, part 1, No. 3, pp. 846-851.*

JP Office Action pursuant to Patent Application No. 2007-116164, Nov. 11, 2008, 5P, Japan Patent Office, Japan.

JP Office Action pursuant to Patent Application No. 2007-294782, Nov. 11, 2008, 5P, Japan Patent Office, Japan.

Chinese Office Action for corresponding CN Application No. 200710192894.9, Jun. 29, 2011, pp. 1-14.

Office Action for corresponding JP Application No. 2009-155274, mailing date: Nov. 8, 2011.

* cited by examiner

GENERATOR INCLUDING AN ELECTRET MEMBER

BACKGROUND OF THE INVENTION

1. Field of the Invention

The present invention relates to an electrostatic operating apparatus.

2. Cross-Reference to Related Applications

The priority application numbers JP2006-319883, Electrostatic Induction Conversion Apparatus, Nov. 28, 2006, Katsuji Mabuchi, Makoto Izumi, JP2007-116164, Electrostatic Induction Conversion Apparatus, Apr. 25, 2007, Katsuji Mabuchi, Makoto Izumi, and JP2007-294782, Electrostatic Operating Apparatus, Nov. 13, 2007, Makoto Izumi, Katsuji Mabuchi, upon which this patent application is based are hereby incorporated by reference.

3. Description of the Background Art

An electrostatic operating apparatus such as an electrostatic induction generator comprising an electret member is known in general. A generator (electrostatic induction generator) comprising a first substrate formed with a plurality of electrodes at prescribed intervals thereon and a second substrate formed with a plurality of electret films as charge retaining materials at prescribed intervals thereon is disclosed as an exemplary conventional electrostatic operating apparatus. The first and second substrates are so provided as to be opposed to each other at a prescribed interval and are electrically connected to each other through a load. In the conventional generator (electrostatic induction generator), the first and second substrates vibrate relatively with each other so that the areas of the electret films located on the regions where the electret films are opposed to the electrodes are increased and decreased, whereby the quantity of charges induced in the electrodes with charges stored in the electret films are changed and the changed charges are outputted (generated) to the load as a current In the conventional generator, when the first and second substrates vibrate, the first and second substrates are electrically connected to each other through the load and hence the relative amounts of movement to the substrates respectively are restricted.

SUMMARY OF THE INVENTION

An electrostatic operating apparatus according to a first aspect of the present invention comprises a first substrate including a first electrode and a second electrode and set in a state where the first electrode and the second electrode are electrically separated from each other at least on the substrate, and a second substrate including an electret member, wherein the first substrate and the second substrate are so provided as to be opposed to each other at an interval and so formed as to be movable relatively with each other, and at least one of the first electrode and the second electrode is so formed as to be capacitively coupled with the electret member.

An electrostatic operating apparatus according to a second aspect of the present invention comprises a first substrate including a first electrode and a second electrode and set in a state where the first electrode and the second electrode are electrically separated from each other at least on the substrate, and a second substrate including an electret member, wherein the first substrate and the second substrate are so provided as to be opposed to each other at an interval and so formed as to be movable relatively with each other.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will be hereinafter described with reference to the drawings. Each of the following embodiments will be described with reference to an electrostatic induction generator comprising an electret member as an exemplary electrostatic operating apparatus of the present invention.

First Embodiment

A structure of an electrostatic induction generator 1 according to a first embodiment of the present invention will be now described with reference to FIGS. 1 to 5.

Figure 1:
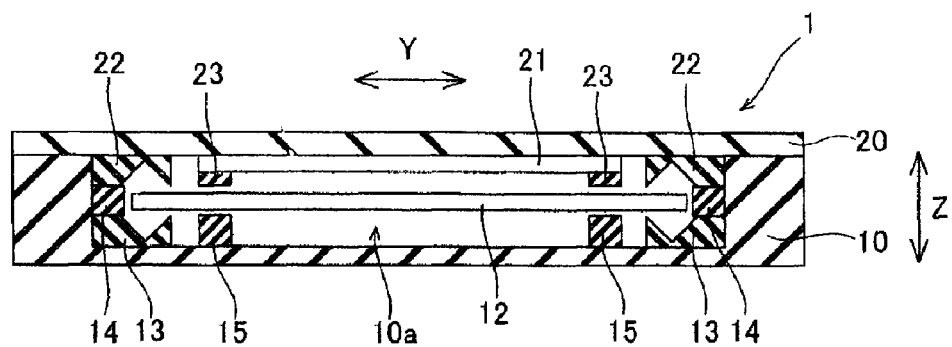
FIG. 1 is a sectional view showing a structure of an electrostatic induction generator according to a first embodiment of the present invention.

The electrostatic induction generator 1 according to the first embodiment comprises a lower housing 110 formed with a storage portion 10a, an upper housing 20 so mounted on an upper surface of the lower housing 10 as to close the storage portion 10a and a bridge rectifier circuit 30 (see FIG. 4) as shown in FIG. 1. A load 2 (see FIG. 4) driven with the electrostatic induction generator 1 is connected to the electrostatic induction generator 1.

Figure 2:
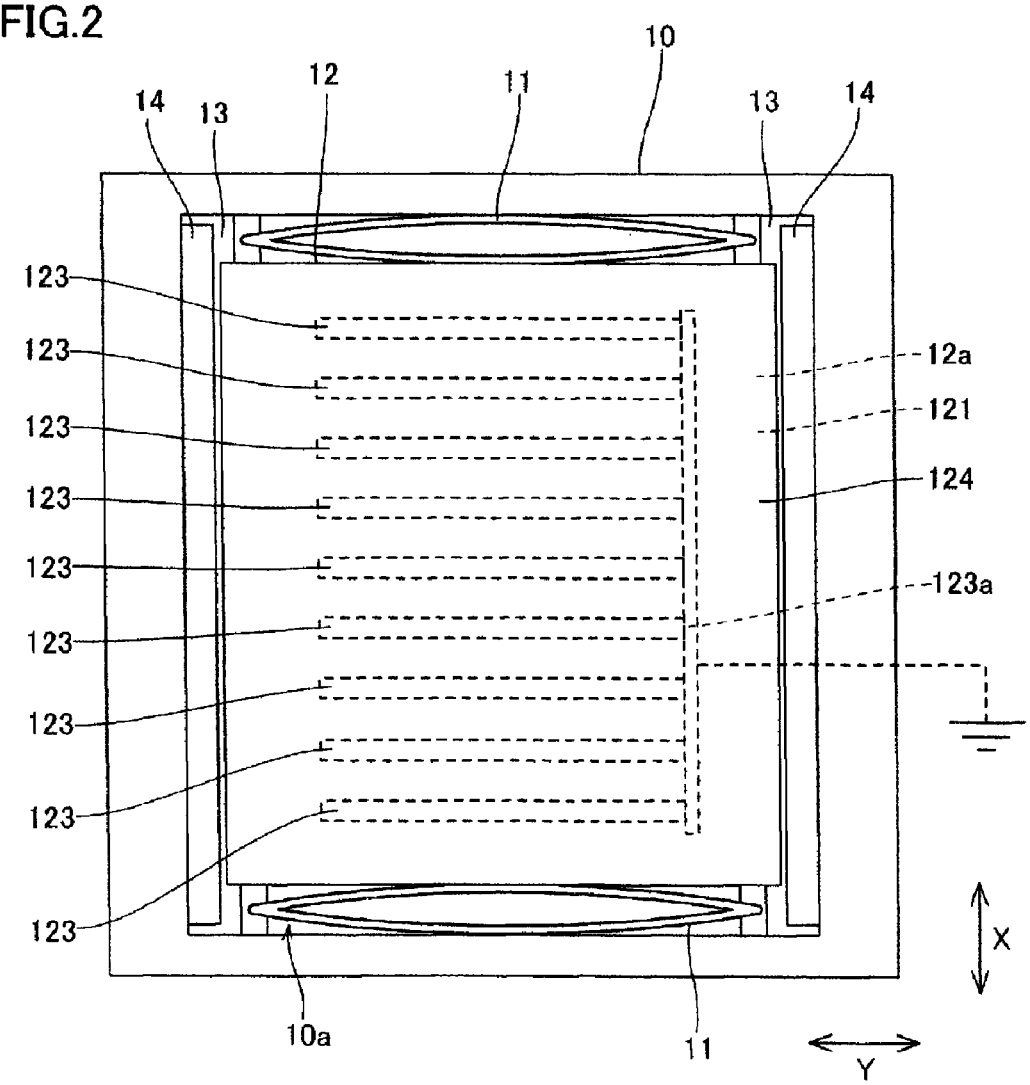
FIG. 2 is a plan view showing a structure of a lower housing of the electrostatic induction generator according to the first embodiment.

As shown in FIGS. 1 and 2, a pair of spring members 11 (see FIG. 2), a movable substrate 12 made of glass or silicon so formed as to be movable in a direction X (see FIG. 2) with the pair of spring members 11, guide portions 13 for guiding the movable substrate 12, and spacers 14 and 15 (see FIG. 1) for regulating a position of the movable substrate 12 are provided in the storage portion 10a of the lower housing 10 of the electrostatic induction generator 1. The spring members 11 are arranged between inner surfaces in the direction X of the storage portion 10a and the movable substrate 12 respectively. The movable substrate 12 has a thickness of about 600 µm. The guide portions 13 and the spacers 14 are so provided along inner surfaces along arrow Y of the storage portion 10a as to extend in the direction X. The guide portions 13 are provided on bottom surface of the storage portion 10a. The spacers 14 each have a function of regulating a position in the direction Y of the movable substrate 112 and are provided on the guide portions 13. The spacers 15 each have a function of regulating a position in a direction Z (see FIG. 1) of the movable substrate 12.

As shown in FIG. 1, the upper housing 20 of the electrostatic induction generator 1 includes a fixed substrate 21 (see FIG. 3) made of glass or silicon so provided as to be opposed to the movable substrate 12 and guide portions 22 for guiding the movable substrate 12. In the fixed substrate 21, the spacers 23 each having a function of regulating the position of the movable substrate 12 are provided on regions corresponding to the spacers 15. Thus, the movable substrate 12 and the fixed substrate 21 are arranged at a prescribed interval. The guide portions 22 are provide along inner surfaces in the direction Y of the storage portion 10a to extend in the direction X (see FIG. 2) so as to be opposed to the guide portions 13.

Figure 4:
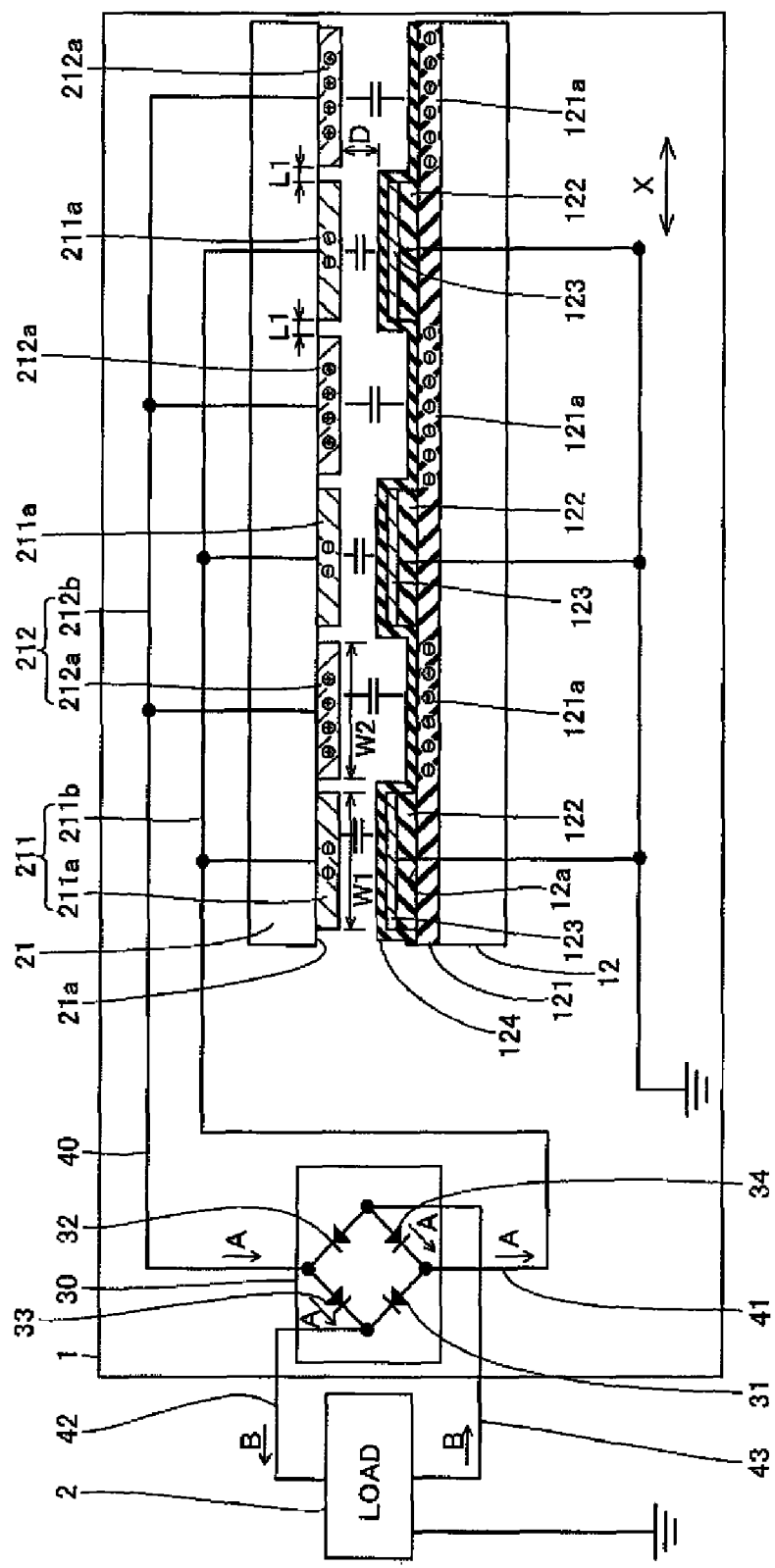
FIGS. 4 and 5 are schematic diagrams showing the structure of the electrostatic induction generator according to the first embodiment.

According to the first embodiment, an electret member 121 is formed on an overall surface of a main surface 12a closer to the fixed substrate 21 of the movable substrate 12 provided in the lower housing 10, as shown in FIGS. 2 and 4. The electret member 121 has a thickness of about 2.4 µm and is made of $SiO_2$ by thermal oxidation. In the electret member 121, negative charges are stored in regions (charge retaining portions 121a) corresponding to regions where after-mentioned insulating films 122 are not formed. Each charge retaining portion 121a is an example of the "third electrode" in the present invention.

As shown in FIG. 4, a plurality of the insulating films 122 are formed on the main surface of the electret member 121 at prescribed intervals (about 1 mm, for example) in the direction X. This insulating films 122 are made of $SiO_2$ by HDP-CVD (high density plasma chemical vapor deposition). The insulating films 122 each have a width of about 1 mm and a thickness of about 2 µm. Each insulating film 122 is provided for separating an after-mentioned conductive layer 123 and the electret member 121 and has a function of inhibiting negative charges stored in the electret member 121 from flowing out into the conductive layer 123. Each conductive layer 123 is an example of the "fourth electrode" in the present invention.

According to the first embodiment, the conductive layers 123 made of Al or the like are formed on the plurality of insulating films 122 respectively. The conductive layers 123 each have a thickness of about 0.3 µm. The plurality of conductive layers 123 are coupled to a coupling portion 123a (see FIG. 2) and the coupling portion 123a is grounded. The charge outflow inhibition film 124 is so formed on the main surface of the electret member 121 as to cover the insulating films 122 and the conductive layers 123. This charge outflow inhibition film 124 has a thickness of about 0.3 µm and consists of MSQ (methyl silses quioxane) or the like. The charge outflow inhibition film 124 is provided for inhibiting the negative charges stored in the electret member 121 from flowing out from the surface. The charge outflow inhibition film 124 is arranged to be spaced at a distance D (about 30 µm, for example) from surfaces (lower surface) of collectors 211 and 212 described later.

Figure 3:
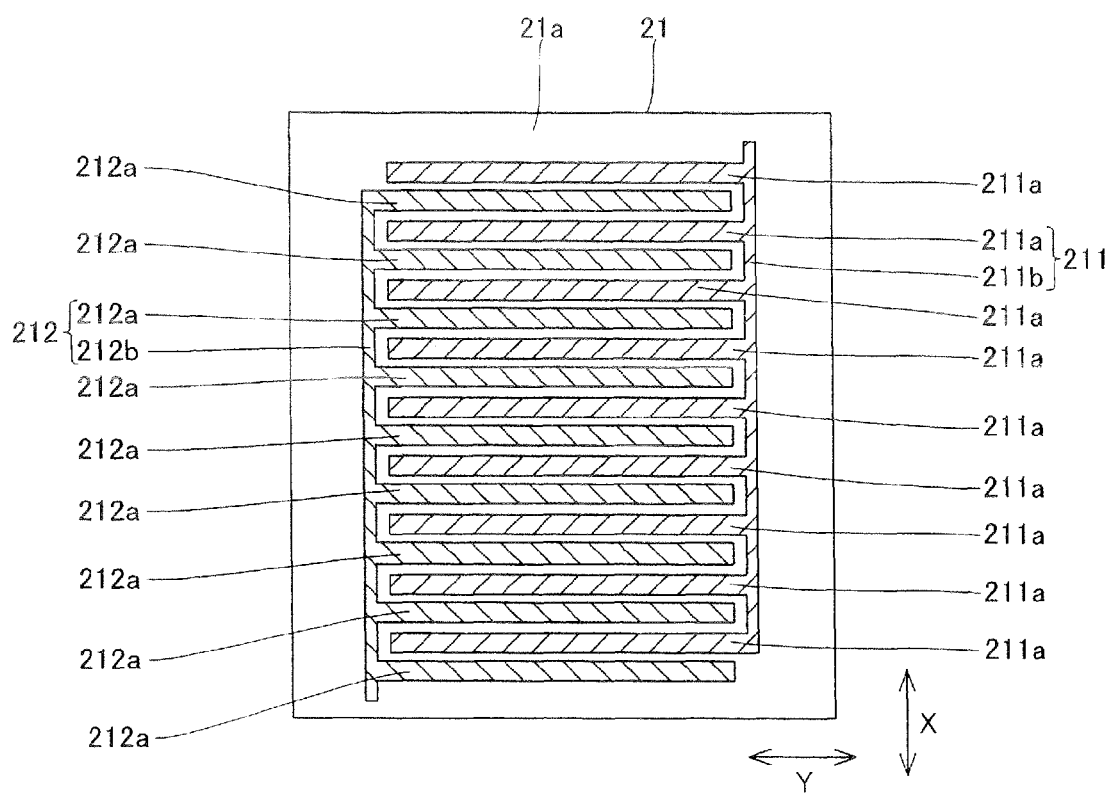
FIG. 3 is a plan view showing a structure of a fixed substrate of the electrostatic induction generator according to the first embodiment.
Figure 12:
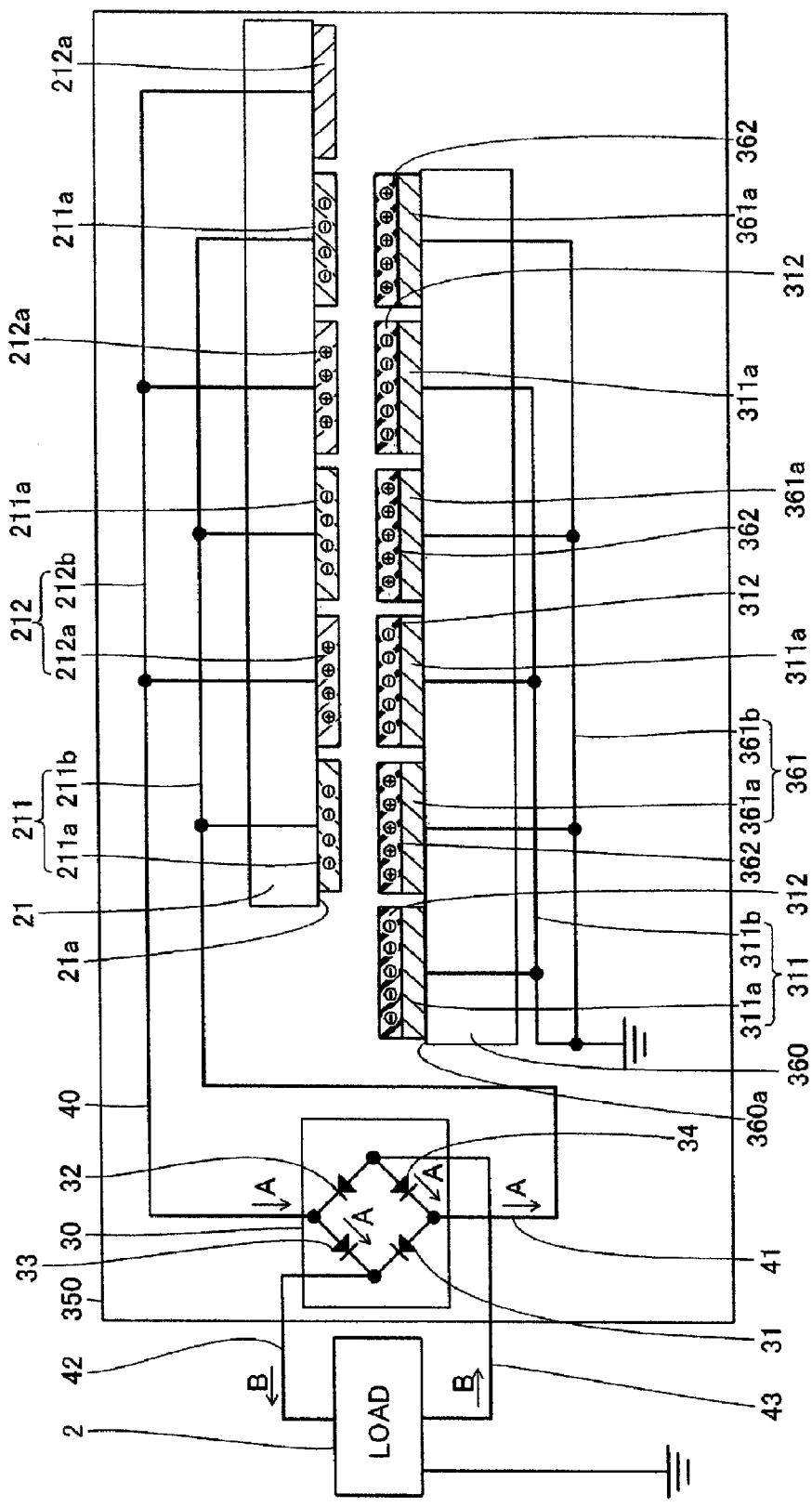
FIG. 12 is a schematic diagram showing the structure of the electrostatic induction generator according to the third embodiment.

According to the first embodiment, the collectors 211 and 212 made of Al, Ti or the like each having a comb shape in plan view are formed on a main surface 21a (see FIG. 4) closer to the movable substrate 12 of the fixed substrate 21, as shown in FIG. 3. The fixed substrate 21 is an example of the "first substrate" in the present invention. The collector 211 has a plurality of collector portions 211a so formed at prescribed intervals in the direction X as to extend in the direction Y and a coupling portion 211b coupling first ends of the plurality of collector portions 211a and so formed as to extend in the direction X. The collector 211 is an example of the "first electrode" in the present invention and the collector portions 211a are examples of the "first electrode portions" in the present invention. As shown in FIG. 4, the collector portions 211a each have a width W1 of about 100 µm to about 1000 µm and a thickness of about 3 µm to 5 µm. A collector 212 has a plurality of collector portions 212a so formed at prescribed intervals in the direction X as to extend in the direction Y and a coupling portion 212b coupling first ends, opposite to the coupling portion 211b of the collector 211, of the plurality of collector portions 212a and so formed as to extend in the direction X. The collector 212 is an example of the "second electrode" in the present invention and the collector portions 212a are examples of the "second electrode portions" in the present invention. As shown in FIG. 12, the collector portions 212a each have a width W2 of about 100 µm to about 1000 µm and a thickness of about 3 µm to 5 µm. Each collector portion 211a of the collector 211 and each collector portion 212a of the collector 212 are alternately provided at an interval L1 of about 10 µm to about 100 µm.

As shown in FIG. 4, the bridge rectifier circuit 30 is provided for rectifying power generated and is electrically connected to the collector 211 of the fixed substrate 21 through a wiring 41. The bridge rectifier circuit 30 is electrically connected to the collector 212 of the fixed substrate 21 through a wiring 40. The load 2 driven by power generated with the electrostatic induction generator 1 is connected to the bridge rectifier circuit 30 through wirings 42 and 43. The load 2 is grounded.

The bridge rectifier circuit 30 includes four diodes 31 to 34. More specifically, an anode of the diode 31 is connected to a cathode of the diode 34 and also connected to the wiring 41. A cathode of the diode 31 is connected to a cathode of the diode 33 and also connected to the load 2 through the wiring 42. An anode of the diode 32 is connected to an anode of the diode 34 and also connected to the load 2 through the wiring 43. A cathode of the diode 32 is connected to an anode of the diode 33 and also connected to the wiring 40. The diode 33 has the anode connected to the wiring 40 and the cathode connected to the load 2 through the wiring 42. The diode 34 has the anode connected to the load 2 through the wiring 43 and the cathode connected to the wiring 41.

In the electrostatic induction generator 1 according to the first embodiment, when the collector portions 211a of the fixed substrate 21 are located on the regions corresponding to the conductive layers 123 of the movable substrate 12, the collector portions 212a of the fixed substrate 21 are located on regions corresponding to the regions where the conductive layers 123 of the movable substrate 12 are not formed (portions of the electret member 121 (charge retaining portions 121a)), as shown in FIG. 4. At this time, positive charges are induced in the collector portions 212a of the fixed substrate 21 with the negative charges retained in the charge retaining portions 121a located on the positions opposed to the collector portions 212a, and the collector portions 212a where the positive charges are induced and the charge retaining portions 121a where the negative charges are retained are capacitively coupled with each other. On the other hand, negative charges are induced in the collector portions 211a of the fixed substrate 21 with the positive charges induced in the collector portions 212a connected to the collector portions 211a through the load 2 and the bridge rectifier circuit 30. The collector portions 211a where the negative charges are induced and the grounded conductive layers 123 are capacitively coupled with each other.

Figure 5:
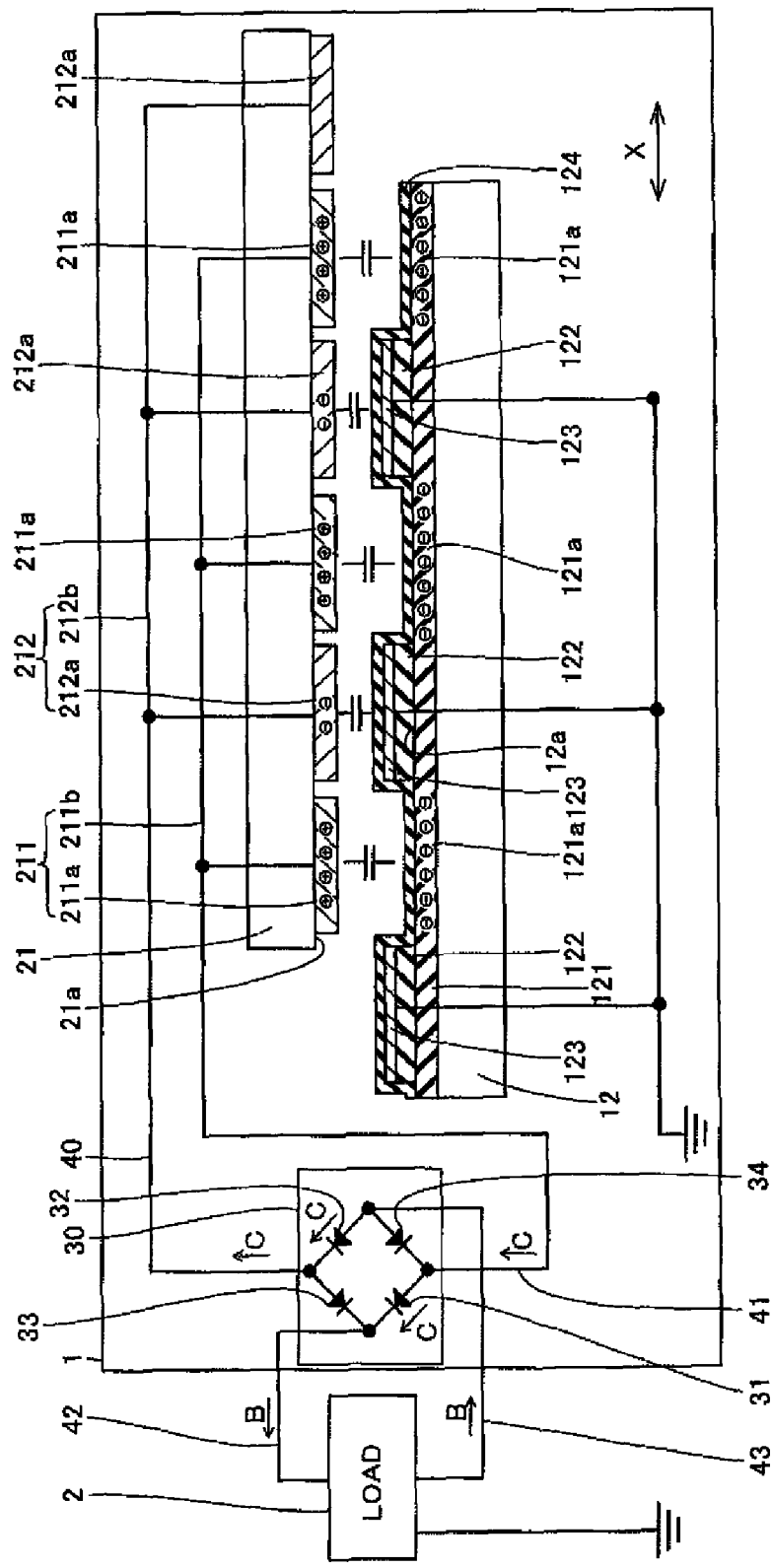

In the electrostatic induction generator 1 according to the first embodiment, when the collector portions 211a of the fixed substrate 21 are located on the regions corresponding to the regions where the conductive layers 123 of the movable substrate 12 are not formed (charge retaining portions 121a), the collector portions 212a of the fixed substrate 21 are located on the region corresponding to the conductive layers 123 of the movable substrate 12, as shown in FIG. 5. At this time, positive charges are induced in the collector portions 211a of the fixed substrate 21 with the negative charges retained in the charge retaining portions 121a located on the positions opposed to the collector portions 211a, and the collector portions 211a where the positive charges are induced and the charge retaining portions 121a where the negative charges are retained are capacitively coupled with each other. On the other hand, negative charges are induced in the collector portions 212a of the fixed substrate 21 with the positive charges induced in the collector portions 211a connected to the collector portions 212a through the load 2 and the bridge rectifier circuit 30. The collector portions 212a where the negative charges are induced and the grounded conductive layers 123 are capacitively coupled with each other.

A power generating operation of the electrostatic induction generator 1 according to the first embodiment of the present invention will be now descried with reference to FIGS. 4 and 5.

As shown in FIG. 4, when the charge retaining portions 121a of the movable substrate 12 and the collector portions 212a of the fixed substrate 21 are opposed to each other and the conductive layers 123 of the movable substrate 12 and the collector portions 211a of the fixed substrate 21 are opposed to each other, positive charges are induced in the collector portions 212a of the fixed substrate 21 and negative charges are induced in the collector portions 211a of the fixed substrate 21. At this time, the charge retaining portions 121a and the collector portions 212a are capacitively coupled with each other. In other words, capacitors are formed between the charge retaining portions 121a and the collector portions 212a, thereby determining the potential of the positive charges induced in the collector portions 212a. Similarly, the conductive layers 123 and the collector portions 211a are capacitively coupled with each other, whereby capacitors are formed between the conductive layers 123 and the collector portions 211a, and hence the potential of the negative charges induced in the collector portions 211a is determined. Thus, the potential difference between the collector portions 212a and 211a is generated, thereby flowing a current along arrow A from the collector portions 212a to the bridge rectifier circuit 30. Then rectification is conducted to output the current along arrow B to the load 2. More specifically, the current flows to the diode 33, the wiring 42, the load 2, the wiring 43 and the diode 34 in this order.

Thereafter, when the movable substrate 12 moves, the charge retaining portions 121a of the movable substrate 12 and the collector portions 211a of the fixed substrate 21 are opposed to each other and the conductive layers 123 of the movable substrate 12 and the collector portions 212a of the fixed substrate 21 are opposed to each other, as shown in FIG. 5. At this time, positive charges are induced in the collector portions 211a of the fixed substrate 21 and negative charges are induced in the collector portions 212a of the fixed substrate 21. Then, the charge retaining portions 121a and the collector portions 211a are capacitively coupled with each other and the conductive layers 123 and the collector portions 212a are capacitively coupled with each other. Thus, the potential of the positive charges induced in the collector portions 211a and the potential of the negative charges induced in the collector portions 212a are determined, thereby generating the potential difference between the collector portions 211a and 212a similarly to the above Then, a current flows along arrow C from the collector portions 211a to the bridge rectifier circuit 30. The bridge rectifier circuit 30 rectifies the current to output the current along arrow B to the load 2. More specifically, the current flows to the diode 31, the wiring 42, the load 2, the wiring 43 and the diode 32 in this order.

The aforementioned operation is repeatedly performed, thereby continuously generating power.

According to the first embodiment, as hereinabove described, the movable substrate 12 and the fixed substrate 21 are opposed to each other at a interval and are movable relatively with each other, and at least one of the collector portions 211a of the collector 211 and the collector portions 212a of the collector 212 and the electret member 121 are capacitively coupled with each other, whereby the potentials of the collector portions 211a and the collector portions 212a can be determined without connecting the side, on which the electret member 121 is formed, of the movable substrate 12 and the side, on which the collectors 211 and 212 are formed, of the fixed substrate 21 to each other. Therefore, potential difference between the collector portions 211a and the collector portions 212a connected to each other through the load 2 can be determined and hence a current can be output to the load 2. In other words, a current can be supplied to the load 2 without connecting the movable substrate 12 and the fixed substrate 21 with a wiring. Consequently, the movable substrate 12 and the fixed substrate 21 are separated from each other, whereby the area of the electret member 121 movable with respect to the collectors 211 and 212 of the fixed substrate 21 is increased and hence power generation efficiency of the electrostatic induction generator 1 can be improved. Thus, conversion efficiency of kinetic energy and electric energy can be improved.

According to the first embodiment, the collectors 211 and 212 each are formed in the form of a comb and the collector portions 211a and 212a are alternately arranged, whereby the area of the electret member 121 of the movable substrate 12 located on the regions opposed to the collector portions 212a of the fixed substrate 21 can be easily decreased (increased) while decreasing (increasing) the area of the electret member 121 of the movable substrate 12, located on the regions opposed to the collector portions 212a of the fixed substrate 21.

According to the first embodiment, the conductive layers 123 are formed at prescribed intervals, whereby also when negative charges stored in the charge retaining portions 121a of the electret member 121 move to the portions corresponding to the conductive layers 123 of the electret member, the regions corresponding to the conductive layers 123 (regions where the collector portions 211a or 212a are located) can be inhibited from being influenced by the negative charges having moved. Thus, the potential difference can be easily generated between the regions corresponding to the regions where the conductive layers 123 are formed and the regions, where the conductive layers 123 are not formed, corresponding to the charge retaining portions 121a.

According to the first embodiment, the collector portions 212a are located on the regions corresponding to the charge retaining portions 121a of the electret member 121 when the collector portions 211a are located on the regions corresponding to the conductive layers 123, and the collector portions 211a are located on the regions corresponding to the charge retaining portions 121a of the electret member 121 when the collector portions 212a are located on the regions corresponding to the conductive layers 123, whereby the movable substrate 12 and the fixed substrate 21 are relatively moved by vibration. Thus, power can be easily generated by increasing and decreasing the areas of the charge retaining portions 121a of the electret member 121 located on the regions opposed to the collector portions 211a and 212a of the fixed substrate 21.

According to the first embodiment, the collector portions 211a and the conductive layers 123 are capacitively coupled with each other and the collector portions 212a and the charge retaining portions 121a of the electret member 121 are capacitively coupled with each other when the collector portions 211a are located on the regions corresponding to the conductive layers 123, while the collector portions 212a and the conductive layers 123 are capacitively coupled with each other and the collector portions 211a and the charge retaining portions 121a of the electret member 121 are capacitively coupled with each other when the collector portions 212a are located on the regions corresponding to the conductive layers 123, whereby the collector portions 211a and 212a are capacitively coupled with either the conductive layers 123 or the charge retaining portions 121a, and hence the potentials of the collector portions 211a and 212a are reliably determined. Thus, potential difference of the collector portions 211a and 212a is determined and hence a current can be reliably supplied to the load 2.

According to the first embodiment, the charge outflow inhibition film 124 is provided on the main surface of the electret member 121, whereby the potential of the electret member 121 can be inhibited from reduction and hence power generation efficiency of the electrostatic induction generator 1 can be inhibited from reduction.

An experiment conducted for confirming the aforementioned effect of formation of the collectors 211 and 212 on the fixed substrate 21 according to the first embodiment will be now described. In this experiment, an electrostatic induction generator according to an example corresponding to the aforementioned first embodiment and an electrostatic induction generator according to a comparative example were prepared. In the electrostatic induction generator according to the example, widths W1 of collector portions 211a and widths W2 of collector portions 212a was set to 1 mm, and an interval L1 between each adjacent pair of collector portions 211a and 212a was set to 30 µm. In the electrostatic induction generator according to the comparative example are similar to the aforementioned electrostatic induction generator according to the example except that only a collector 211 was formed on a fixed substrate 21. The quantity of power generation per unit area of the electrostatic induction generator according to the example and the electrostatic induction generator according to the comparative example were measured under conditions of an amplitude (the amount of the movement in the direction X) of 1 mm, a frequency of 30 Hz, a measurement area of 4 cm$^2$, and a surface potential of the electret member 121 of −272 V.

The aforementioned measurement was conducted four times. The average thereof of the electrostatic induction generator according to the example was 5.25 µW/cm$^2$, while the average thereof of the electrostatic induction generator according to the comparative example was 2.51 µW/cm$^2$. It has been proved from the aforementioned measurement results that the quantity of power generation of the electrostatic induction generator according to the example where the collectors 211 and 212 were formed on the fixed substrate 21 is about 2.1 times that of the electrostatic induction generator according to the comparative example where only the collector 211 was formed on the fixed substrate 21.

A simulation conducted for confirming influence of the interval L1 between each adjacent pair of collector portions 211a and 212a formed on the fixed substrate 21 will be now described. In this simulation, the width W1 of each collector portion 211a and the width W2 of each collector portion 212a were set to 1 mm, and the overall widths of the collector portions 211a and 212a were set to 10 mm. The width of each conductive layer 123 was set to 1 mm and the interval between each adjacent pair of the conductive layers 123 was set to 1 mm. The relation between the interval L1 between each adjacent pair of collector portions 211a and 212a and the quantity of power generation was calculated. The results thereof are shown in FIG. 6.

Figure 6:
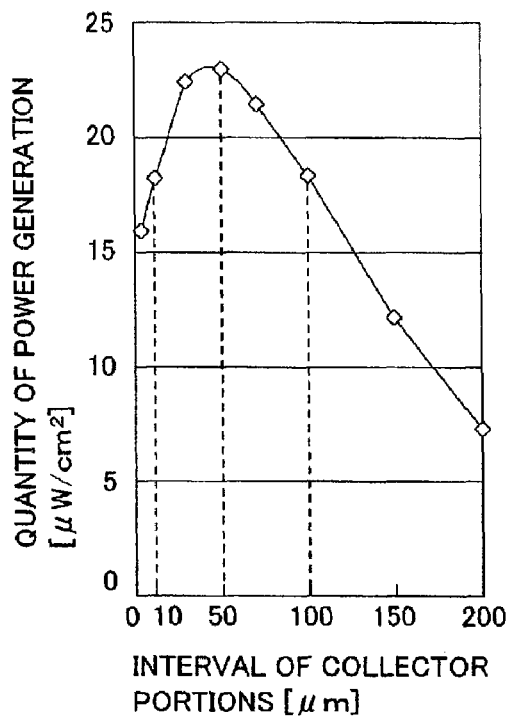
FIG. 6 is a graph showing the relation between the interval of each adjacent pair of collector portions and the quantity of power generation obtained by a simulation.

From the simulation results shown in FIG. 6, the quantity of power generation was maximized when the interval L1 was 50 µm. In other words, it has been proved that the quantity of power generation is maximized when the interval L1 was 1/20 (=50 µm/1 mm) of the width W1 of each collector portion 211a and the width W2 of each collector portion 212a. The interval L1 is conceivably preferably 10 µm to 100 µm in order to ensure the quantity of power generation of at least 75% of the peak value of the quantity of power generation. In other words, it has been proved that the interval L1 is preferably 1/100 (=10 µm/1 mm) to 1/10 (=100 µm/1 mm) of the width W1 of each collector portion 211a and the width W2 of each collector portion 212a.

Second Embodiment

Figure 7:
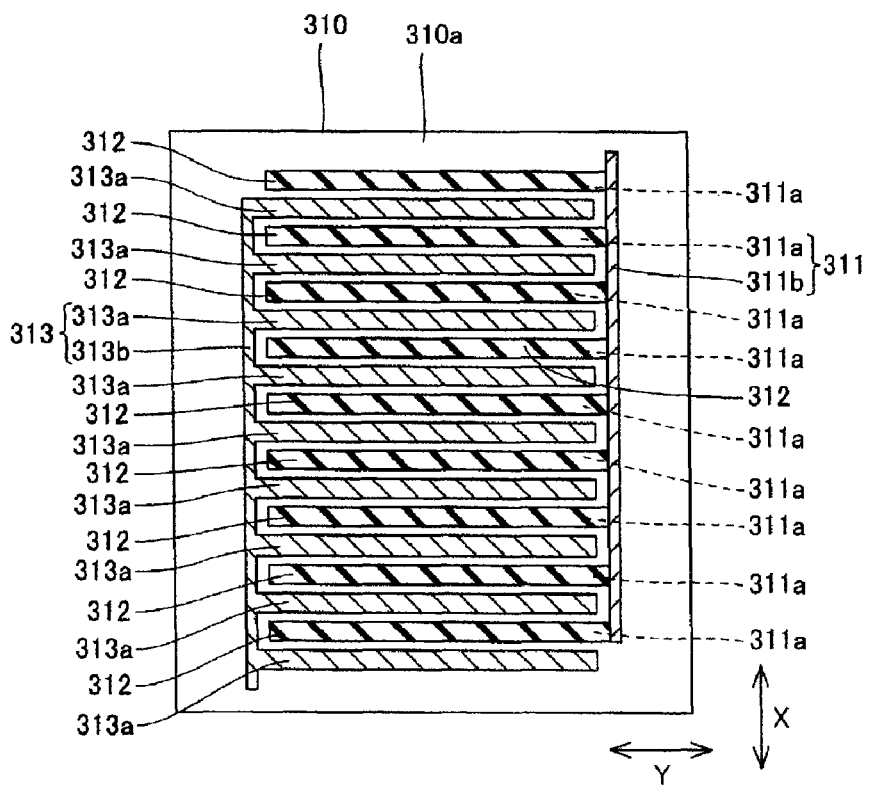
FIG. 7 is a schematic diagram showing a structure of a movable substrate of an electrostatic induction generator according to a second embodiment of the present invention.
Figure 8:
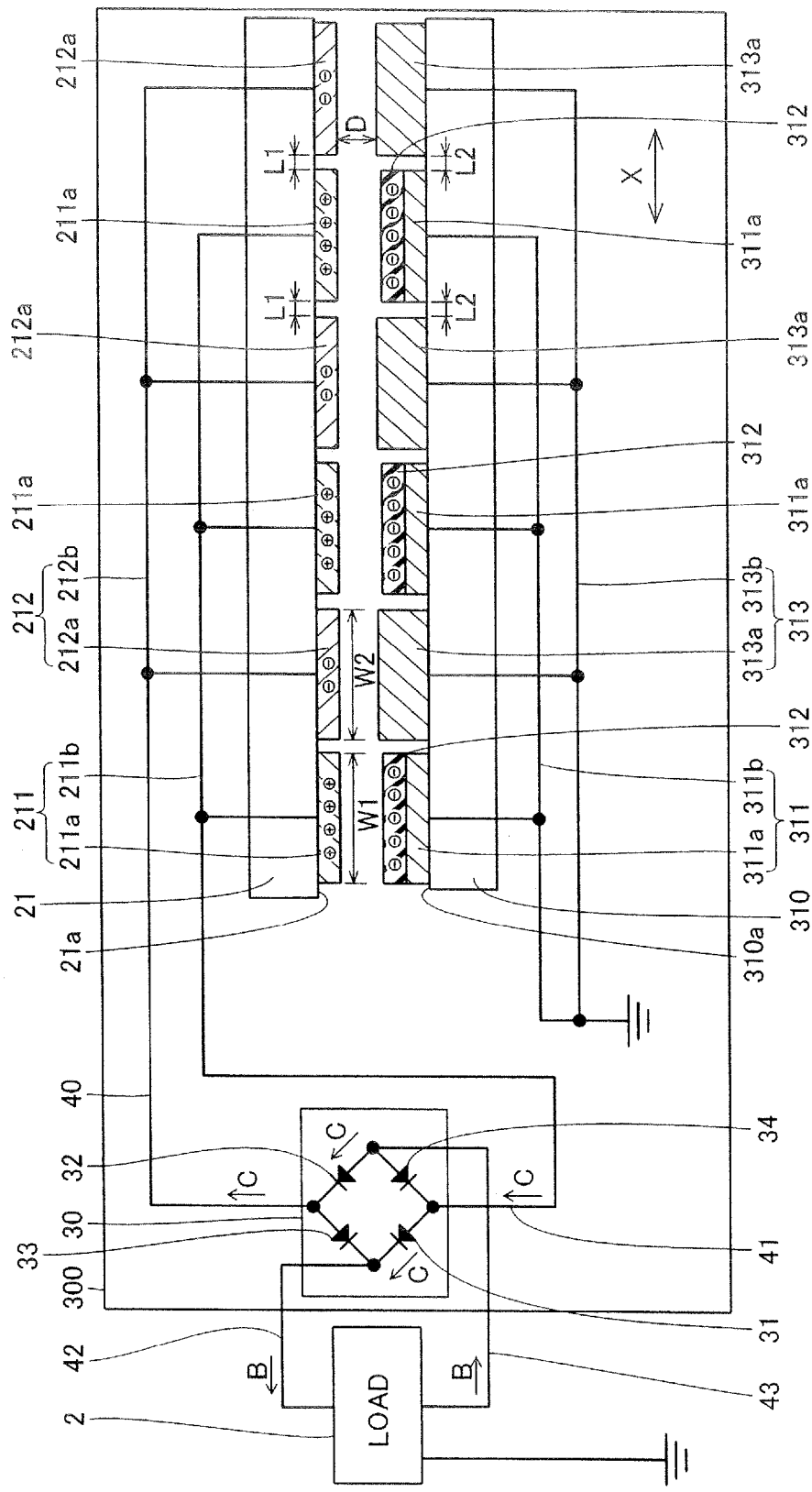
FIG. 8 is a schematic diagram showing a structure of the electrostatic induction generator according to the second embodiment.

As shown in FIGS. 7 and 8, in an electrostatic induction generator 300 according to a second embodiment, an electrode 311 and a guard electrode 313 each formed in the form of a comb are formed on a main surface 310a of a movable substrate 310, dissimilarly to the aforementioned first embodiment.

In the electrostatic induction generator 300 according to the second embodiment, the electrode 311 made of Al, Ti or the like having a comb shape in plan view is formed on the main surface 310a closer to a fixed substrate 21 of the movable substrate 310 made of glass, silicon or the like, as shown in FIGS. 7 and 8. The movable substrate 12 is an example of the "second substrate" in the present invention. This electrode 311 has a plurality of electrode portions 311a so formed at prescribed intervals in a direction X as to extend in a direction Y and a coupling portion 311b coupling first ends of the plurality of electrode portions 311a and so formed as to extend in the direction X. The collector portions 311a each have a width of about 100 µm to about 1000 µm and a thickness of about 3 µm to about 5 µm.

According to the second embodiment, electret members 312 made of SiO$_2$ are formed on regions corresponding to the electrode portions 311a on the electrode portions 311a of the electrode 311, as shown in FIGS. 7 and 8. More specifically, a plurality of the electret members 312 are so formed at prescribed intervals along arrow X as to extend along arrow Y. The electret members 312 each store negative charges and have a width of about 100 μm to about 1000 μm and a thickness of about 3 μm to about 5 μm. The electret members 312 are examples of the "third electrodes" in the present invention.

According to the second embodiment, the guard electrode 313 made of Al, Ti or the like having a comb shape in plan view is formed on the main surface 310a closer to a fixed substrate 21 of the movable substrate 310, as shown in FIGS. 7 and 8. The guard electrode 313 has a plurality of guard electrode portions 313a so formed at prescribed intervals in the direction X as to extend in the direction Y and a coupling portion 313b coupling first ends, opposite to the coupling portion 311b of the electrode 311, of the plurality of guard electrode portions 313a and so formed as to extend in the direction X. The guard electrode portions 313a each are provided between the electrode portions 311a of the electrode 311 and have a width of about 100 μm to about 1000 μm and a height larger than that of an upper surface of the electret member 312. Each adjacent pair of electrode portions 311a of the electrode 311 and guard electrode portions 313a of the guard electrode 313 are provided at an interval L2 of about 10 μm to about 100 μm. The electrode portions 311a of the electrode 311 and the guard electrode portions 313a of the guard electrode 313 are grounded at 0 V. The guard electrode portions 313a are examples of the "fourth electrodes" in the present invention.

According to the second embodiment, the guard electrode portions 313a of the movable substrate 310 are located on regions opposed to the collector portions 212a of the fixed substrate 21 when the electret members 312 of the movable substrate 310 are located on regions opposed to the collector portions 211a of the fixed substrate 21, as shown in FIG. 8. At this time, positive charges are induced in the collector portions 211a of the fixed substrate 21 with the negative charges retained in the electret members 312 located on the positions opposed to the collector portions 211a, and the collector portions 211a where the positive charges are induced and the electret members 312 where the negative charges are retained are capacitively coupled with each other. On the other hand, negative charges are induced in the collector portions 212a of the fixed substrate 21 with the positive charges induced in the collector portions 211a connected to the collector portions 212a through the load 2 and the bridge rectifier circuit 30. The collector portions 212a where the negative charges are induced and the grounded guard electrode portions 313a are capacitively coupled with each other.

Figure 9:
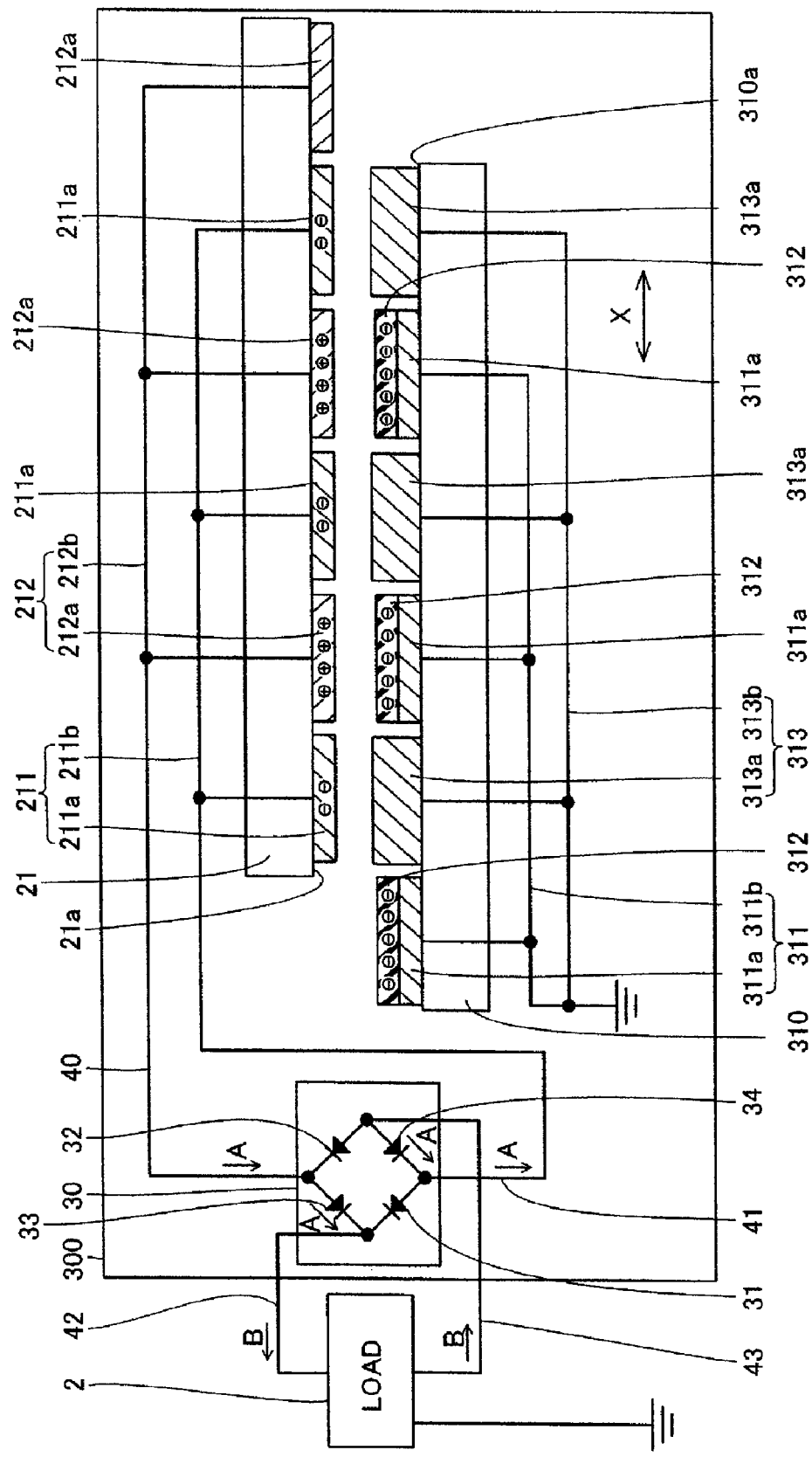
FIG. 9 is a schematic diagram showing the structure of the electrostatic induction generator according to the second embodiment.

As shown in FIG. 9, the guard electrode portions 313a of the movable substrate 12 are located on regions opposed to the collector portions 211a of the fixed substrate 21 when the electret members 312 of the movable substrate 310 are located on regions opposed to the collector portions 212a of the fixed substrate 21. At this time, positive charges are induced in the collector portions 212a of the fixed substrate 21 with the negative charges retained in the electret members 312 located on the positions opposed to the collector portions 212a, and the collector portions 212a where the positive charges are induced and the electret members 312 where the negative charges are retained are capacitively coupled with each other. On the other hand, negative charges are induced in the collector portions 211a of the fixed substrate 21 with the positive charges induced in the collector portions 212a connected to the collector portions 211a through the load 2 and the bridge rectifier circuit 30. The collector portions 211a where the negative charges are induced and the grounded guard electrode portions 313a are capacitively coupled with each other.

The remaining structure of the second embodiment is similar to that of the aforementioned first embodiment.

A power generating operation of the electrostatic induction generator 300 according to the second embodiment will be now descried with reference to FIGS. 8 and 9.

As shown in FIG. 8, when the electret members 312 of the movable substrate 310 and the collector portions 211a of the fixed substrate 21 are opposed to each other and the guard electrode portions 313a of the movable substrate 310 and the collector portions 212a of the fixed substrate 21 are opposed to each other, positive charges are induced in the collector portions 211a of the fixed substrate 21 and negative charges are induced in the collector portions 212a of the fixed substrate 21. At this time, the electret members 312 and the collector portions 211a are capacitively coupled with each other and the guard electrode portions 313a and the collector portions 212a are capacitively coupled with each other. In other words, capacitors are formed between the electret members 312 and the collector portions 211a, thereby determining the potential of the positive charges induced in the collector portions 211a. Similarly, capacitors are formed between the guard electrode portions 313a and the collector portions 212a, and hence the potential of the negative charges induced in the collector portions 212a are determined. Thus, the potential difference between the collector portions 212a and 211a is generated, thereby flowing a current along arrow C from the collector portions 211a to the bridge rectifier circuit 30. Then rectification is conducted to output the current along arrow B to the load 2. More specifically, the current flows to the diode 31, the wiring 42, the load 2, the wiring 43 and the diode 32 in this order.

Thereafter, as shown in FIG. 9, the electret members 312 of the movable substrate 310 and the collector portions 212a of the fixed substrate 21 are opposed to each other, and the guard electrode portions 313a of the movable substrate 310 and the collector portions 211a of the fixed substrate 21 are opposed to each other. At this time, positive charges are induced in the collector portions 212a of the fixed substrate 21 and negative charges are induced in the collector portions 211a of the fixed substrate 21. Then, the electret members 312 and the collector portions 212a are capacitively coupled with each other and the guard electrode portions 313a and the collector portions 211a are capacitively coupled with each other. Thus, similarly to the above, the potential of the positive charges induced in the collector portions 212a is determined and the potential of the negative charges induced in the collector portions 211a is determined, thereby generating the potential difference between the collector portions 212a and 211a. Then, a current flows along arrow A from the collector portions 212a to the bridge rectifier circuit 30, and the bridge rectifier circuit 30 rectifies the current to supply the current along arrow B to the load 2. More specifically, the current flows to the diode 33, the wiring 42, the load 2, the wiring 43 and the diode 34 in this order.

The aforementioned operation is repeatedly performed, thereby continuously generating power.

According to the second embodiment, as hereinabove described, the electret members 312 of the movable substrate 310 and the guard electrode portions 313a of the guard electrode 313, and the collector portions 211a and 212a of the fixed substrate 21 can be capacitively coupled with each other also when the electret members 312 and the guard electrode 313 are formed on the movable substrate 310, and hence a current can be supplied to the load 2 with no wiring between the fixed substrate 21 and the movable substrate 310.

According to the second embodiment, the guard electrode portions 313a are provided between the electret members 312, the potential difference between the regions opposed to the electret members 312 and the regions opposed to the guard electrode portions 313a can be increased, and hence the quantity of charges induced in the collector portions 211a and 212a on the fixed substrate 21 can be increased when the movable substrate 310 vibrates. This also improves power generation efficiency of the electrostatic induction generator 300.

According to the second embodiment, the height of the upper surface of each electret member 312 is larger than that of each guard electrode portion 313a, whereby the potential difference between the regions opposed to the electret members 312 and the regions opposed to the guard electrode portions 313a can be increased.

The remaining effects of the second embodiment are similar to those of the first embodiment.

Third Embodiment

Figure 10:
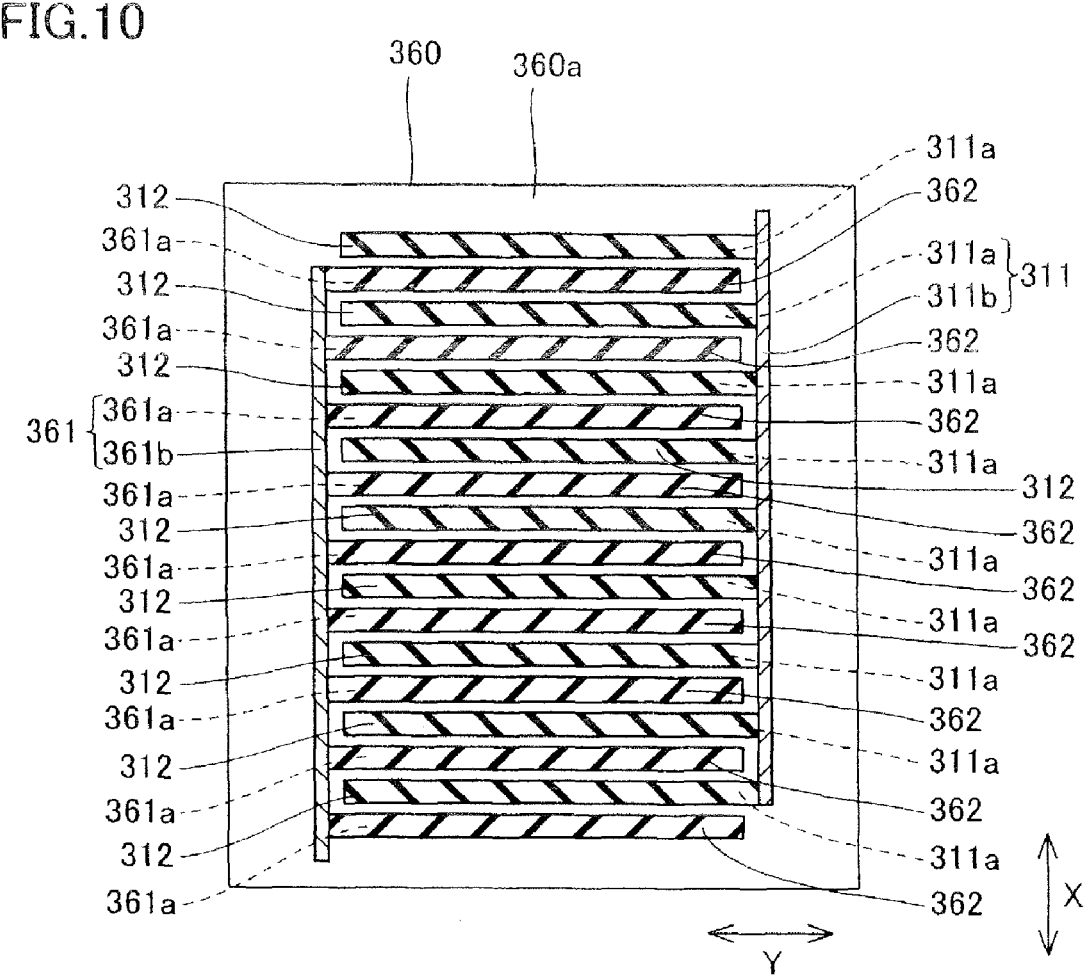
FIG. 10 is a schematic diagram showing a structure of a movable substrate of an electrostatic induction generator according to a third embodiment of the present invention.
Figure 11:
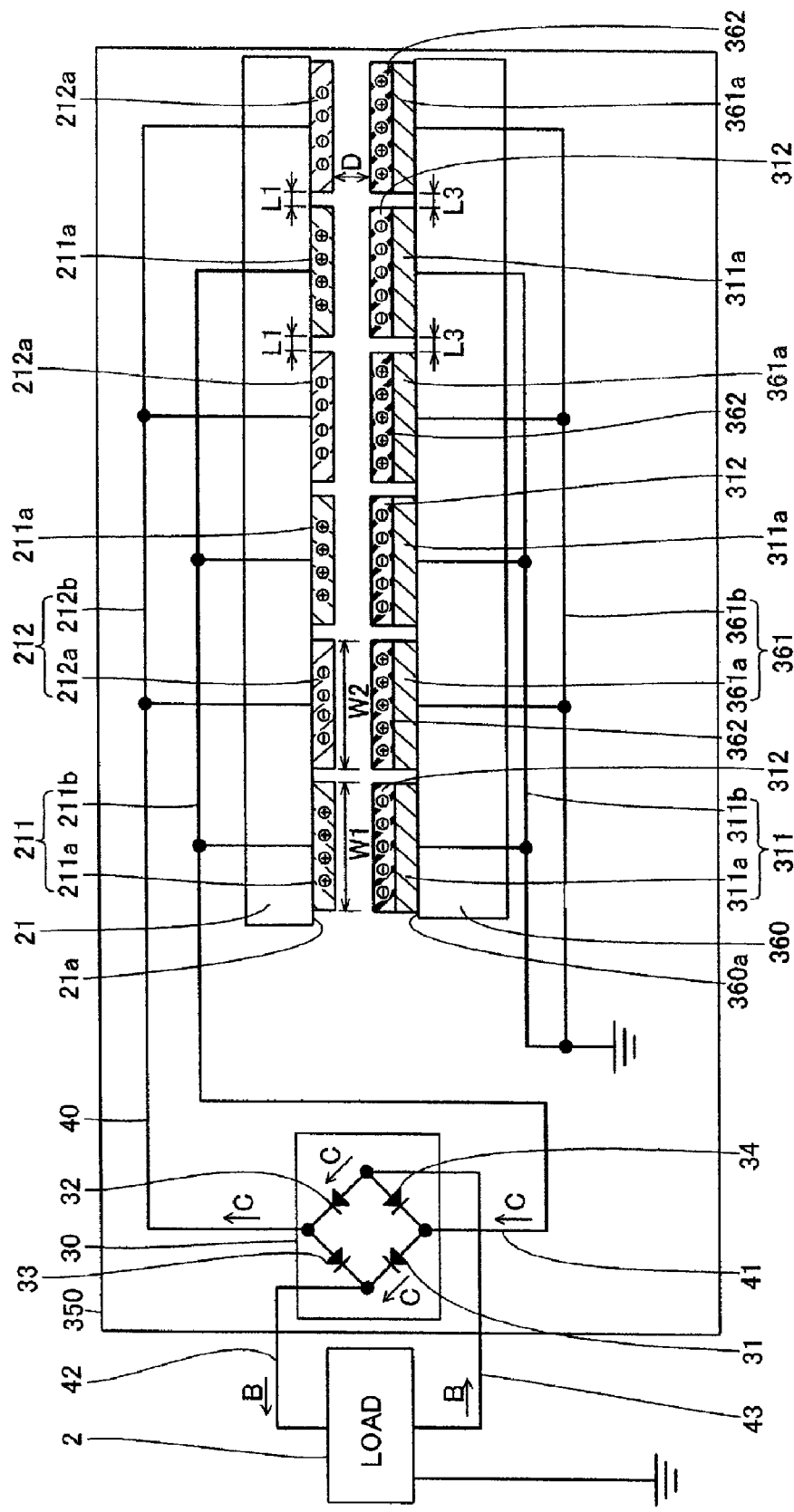
FIG. 11 is a schematic diagram showing a structure of the electrostatic induction generator according to the third embodiment.

As shown in FIGS. 10 to 12, in an electrostatic induction generator 350 according to a third embodiment, electret members 312 storing negative charges and electret members 362 storing positive charges are formed on a main surface 360a of a movable substrate 360, dissimilarly to the second embodiment where the electret members 312 and the guard electrode portions 313a are formed.

In the electrostatic induction generator 350 according to the third embodiment, an electrode 311 having a comb shape is formed on the main surface 360a closer to a fixed substrate 21 of the movable substrate 360 made of glass, silicon or the like, as shown in FIGS. 10 and 11. The electret members 312 storing negative charges are formed on regions corresponding to electrode portions 311a on the electrode portions 311a of the electrode 311. The movable substrate 360 is an example of the "second substrate" in the present invention.

According to the third embodiment, an electrode 361 made of Al, Ti or the like having a comb shape in plan view is formed on the main surface 360a closer to the fixed substrate 21 of the movable substrate 360. This electrode 361 has a plurality of electrode portions 361a so formed at prescribed intervals in a direction X as to extend in a direction Y and a coupling portion 361b coupling first ends, opposite to a coupling portion 311b of the electrode 311, of the plurality of electrode portions 361a and so formed as to extend in the direction X. The collector portions 361a each are provided between the electrode portions 311a of the electrode 311 and have a width of about 100 μm to about 1000 μm and a thickness of about 3 μm to about 5 μm. Each adjacent pair of electrode portions 311a of the electrode 311 and electrode portions 361a of the electrode 361 are provided at an interval L3 of about 10 μm to about 100 μm. The electrode portions 311a of the electrode 311 and the electrode portions 361a of the electrode 361 are grounded.

According to the third embodiment, the electret members 362 made of SiO$_2$ are formed on regions corresponding to the electrode portions 361a on the electrode portions 361a of the electrode 361. More specifically, a plurality of the electret members 362 are so formed at prescribed intervals in the direction X as to extend in the direction Y. The electret members 362 each store positive charges and have a width of about 100 μm to about 1000 μm and a thickness of about 3 μm to about 5 μm. The electret members 362 are examples of the "fourth electrodes" in the present invention.

According to the third embodiment, the electret members 362 of the movable substrate 360 are located on regions opposed to the collector portions 212a of the fixed substrate 21 when the electret members 312 of the movable substrate 360 is located on regions opposed to the collector portions 211a of the fixed substrate 21 as shown in FIG. 11, while the electret members 362 of the movable substrate 360 are located on regions opposed to the collector portions 211a of the fixed substrate 21 when the electret members 312 of the movable substrate 360 are located on regions opposed to the collector portions 212a of the fixed substrate 21 as shown in FIG. 12. At this time, positive charges are induced in the collector portions 211a of the fixed substrate 21 with the negative charges retained in the electret members 312 located on the positions opposed to the collector portions 211a, and the collector portions 211a where the positive charges are induced and the electret members 312 where the negative charges are retained are capacitively coupled with each other. On the other hand, negative charges are induced in the collector portions 212a of the fixed substrate 21 with the positive charges retained in the electret members 362 located on the positions opposed to the collector portions 212a, and the collector portions 212a where the negative charges are induced and the electret members 362 where the positive charges are retained are capacitively coupled with each other.

The remaining structure of the third embodiment is similar to that of the aforementioned second embodiment.

A power generating operation of the electrostatic induction generator 350 according to the third embodiment will be now descried with reference to FIGS. 11 and 12.

As shown in FIG. 11, when the electret members 312 of the movable substrate 360 and the collector portions 211a of the fixed substrate 21 are opposed to each other and the electret members 362 of the movable substrate 360 and the collector portions 212a of the fixed substrate 21 are opposed to each other, positive charges are induced in the collector portions 211a of the fixed substrate 21 and negative charges are induced in the collector portions 212a of the fixed substrate 21. At this time, the electret members 312 and the collector portions 211a are capacitively coupled with each other and the electret members 362 and the collector portions 212a are capacitively coupled with each other. In other words, capacitors are formed between the electret members 312 and the collector portions 211a, thereby determining the potential of the positive charges induced in the collector portions 211a. Similarly, capacitors are formed between the electret members 362 and the collector portions 212a, and hence the potential of the negative charges induced in the collector portions 212a are determined. Thus, the potential difference between the collector portions 211a and 212a is generated, thereby flowing a current along arrow C from the collector portions 211a to the bridge rectifier circuit 30. Then rectification is conducted to output the current along arrow B to the load 2. More specifically, the current flows to the diode 31, the wiring 42, the load 2, the wiring 43 and the diode 32 in this order.

Thereafter, as shown in FIG. 12, the electret members 312 of the movable substrate 360 and the collector portions 212a of the fixed substrate 21 are opposed to each other, and the electret members 362 of the movable substrate 360 and the collector portions 211a of the fixed substrate 21 are opposed to each other. At this time, positive charges are induced in the collector portions 212a of the fixed substrate 21 and negative charges are induced in the collector portions 211a of the fixed substrate 21. Then, the electret members 312 and the collector portions 212a are capacitively coupled with each other and the electret members 362 and the collector portions 211a are capacitively coupled with each other. Thus, similarly to the above, the potential of the positive charges induced in the collector portions 212a is determined and the potential of the negative charges induced in the collector portions 211a is determined, thereby generating the potential difference between the collector portions 212a and 211a. Then, a current flows along arrow A from the collector portions 212a to the bridge rectifier circuit 30, and the bridge rectifier circuit 30 rectifies the current to output the current along arrow B to the load 2. More specifically, the current flows to the diode 33, the wiring 42, the load 2, the wiring 43 and the diode 34 in this order.

According to the third embodiment, as hereinabove described, the electret members 312 of the movable substrate 360 and the electret members 362, and the collector portions 211a and 212a of the fixed substrate 21 can be capacitively coupled with each other also when the electret members 312 storing negative charges and the electret members 362 storing positive charges are formed on the movable substrate 360, and hence a current can be supplied to the load 2 with no wiring between the fixed substrate 21 and the movable substrate 360.

According to the third embodiment, the electret members 362 storing positive charges are provided between the electret members 312 storing negative charges, whereby the potential difference between the regions opposed to the electret members 312 and regions opposed to the electret members 362 can be increased and hence the quantity of charges induced in the collector portions 211a and 212a of the fixed substrate 21 can be increased when the movable substrate 360 vibrates. Thus, power generation efficiency of the electrostatic induction generator 350 can be further improved.

The remaining effects of the third embodiment are similar to those of the first embodiment.

Although the present invention has been described and illustrated in detail, it is clearly understood that the same is by way of illustration and example only and is not to be taken by way of limitation, the spirit and scope of the present invention being limited only by the terms of the appended claims.

For example, while the electret member(s) made of $SiO_2$ is(are) employed in each of the aforementioned first to third embodiments, the present invention is not restricted to this but electret member(s) made of an organic polymer compound such as polytetrafluoroethylene (PTFE), polypropylene (PP) and polyethylene (PE) or a silicon compound such as SiN may alternatively be employed. Teflon (registered trademark) and Cytop (registered trademark) may be employed as Polytetrafluoroethylene.

While the electrostatic induction generator is shown as an exemplary electrostatic operating apparatus in each of the aforementioned first to third embodiments, the present invention is not restricted to this but the present invention is also applicable to other electrostatic operating apparatus such as an actuator of an electrostatic induction type so far as the electrostatic operating apparatus includes an electret member.

While the collectors are formed in the form of combs and the electret member(s) is(are) formed on the electrode portions of the electrode(s) in each of the aforementioned first to third embodiments, the present invention is not restricted to this but the collector portions of the collectors and the electret member(s) may be alternatively formed in other shapes so far as the opposed area is changed by vibration.

While the bridge rectifier circuit 30 is provided as a circuit portion of the present invention in each of the aforementioned first to third embodiments, the present invention is not restricted to this but a circuit portion constituted by a bridge rectifier circuit and a DC-DC converter or a circuit portion constituted by only the DC-DC converter may be alternatively provided.

While the electret member(s) storing negative charges is(are) formed on the movable substrate in each of the aforementioned first to third embodiments, the present invention is not restricted to this but an electret member(s) storing positive charges may be alternatively formed on the fixed substrate.

While the electret member(s) is(are) formed on the movable substrate and the collectors are formed on the fixed substrate in each of the aforementioned first to third embodiments, the present invention is not restricted to this but the collectors may be alternatively formed on the movable substrate and the electret member(s) may be alternatively formed on the fixed substrate.

Figure 13:
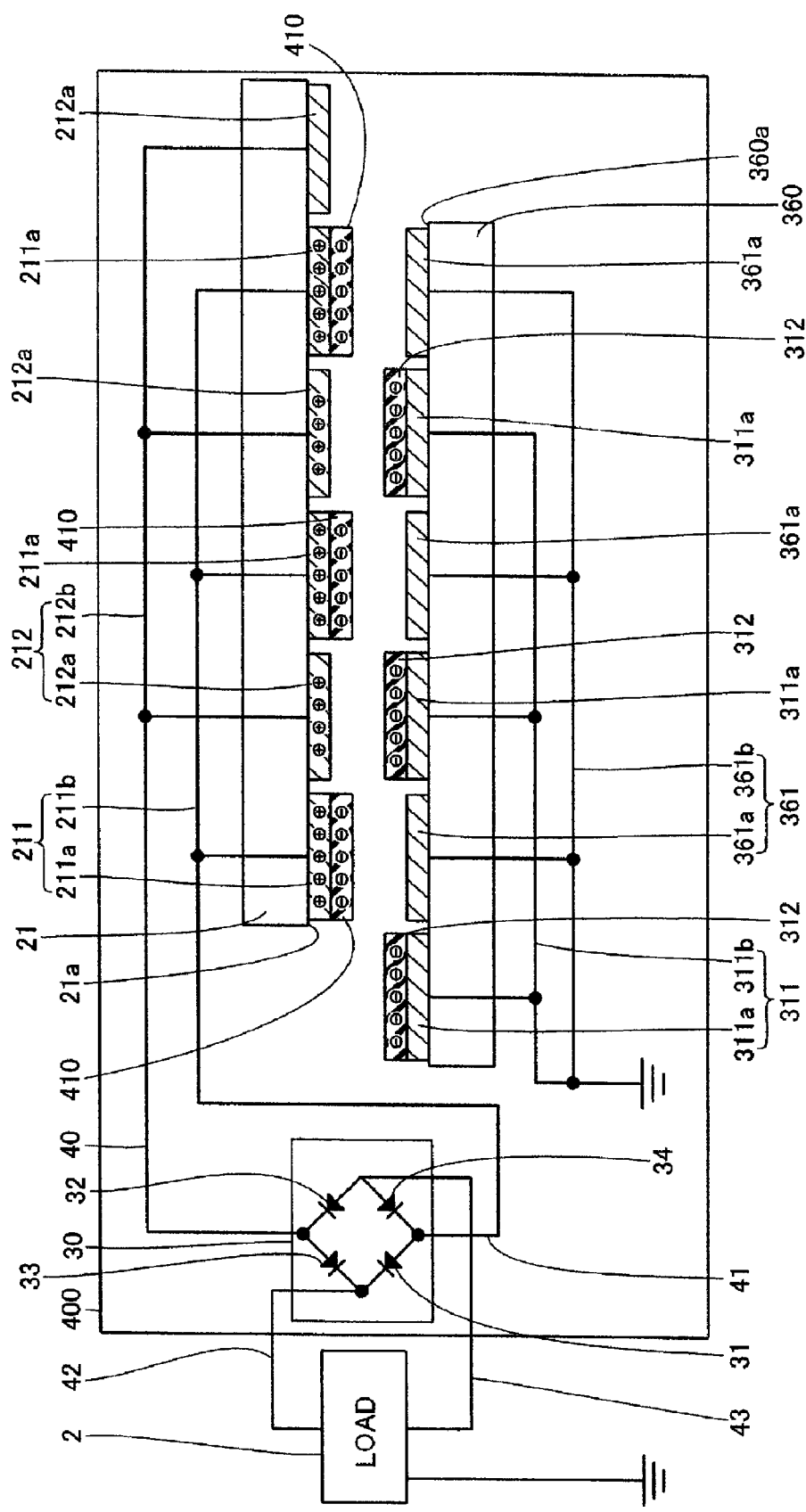
FIG. 13 is a schematic diagram for illustrating a modification of the electrostatic induction generator according to the third embodiment.

While the two electrodes formed in the form of combs are formed on the fixed substrate and also formed on the movable substrate and the electret members are formed on the surfaces of the two electrodes formed on the movable substrate in the aforementioned third embodiment, the present invention is not restricted to this but the electret members may be alternatively formed on the surfaces of one of the two electrodes formed on the movable substrate and one of the two electrodes formed on the fixed substrate. More specifically, while the electret members 312 and 362 are arranged on the electrodes 311a and 361a of the movable substrate 360 respectively in the third embodiment (see FIG. 11), electret members 312 are formed on electrodes 311a of a movable substrate 360 and electret members 410 are arranged on collector portions 211a of a collector 211 of a fixed substrate 21 in an electrostatic induction generator 400 according to a modification of the third embodiment as shown in FIG. 13. Thus, positive charges are induced in the collector portions 211a with the electret members 410 and the electrodes 361a of the grounded movable substrate 360 each have a function as a guard electrode. When the collector portions 212a and the electret members 312 are opposed to each other, a current flows to a load resulting from the potential difference between the potential of the collector portions 212a determined by capacitive coupling between the collector portions 212a and the electret members 312 and the potential of the collector portions 211a by positive charges induced with the electret members 410. When the collector portions 212a and the electrodes 361a are opposed to each other a current flows to the load 2 resulting from the potential difference between the potential of the collector portions 212a capacitively coupled with the electrodes 361a and the potential of the collector portions 211a by positive charges induced with the electret members 312 and 410. Thus, a current can be supplied to the load 2 with no wiring between the substrates also when the electret members 312 and 410 are arranged on the fixed substrate 21 and the movable substrate 360 respectively.

What is claimed is:

1. A generator comprising:
   a first substrate including a first electrode and a second electrode and set in a state where said first electrode and said second electrode are electrically separated from each other at least on the substrate; and
   a second substrate including an electret member, wherein said first substrate and said second substrate are so provided as to be opposed to each other at an interval and so formed as to vibrate relatively with each other and generate by the electrostatic induction operation,
   said second substrate includes a third electrode and a fourth electrode,
   one of said third electrode and said fourth electrode is said electret member into which negative charges are stored, and the other of said third electrode and said fourth electrode is a conductive layer, one of said first electrode and said second electrode is so formed as to be capacitively coupled with said electret member into which negative charges are stored, and the other of said first electrode and said second electrode is so formed as to be capacitively coupled with said conductive layer, at least one of said third electrode and said fourth electrode is said electret member, said second electrode is located on a region opposed to said fourth electrode when said first electrode is located on a region opposed to said third electrode, while said first electrode is located on the region opposed to said fourth electrode when said second electrode is located on the region opposed to said third electrode, said electret member is formed substantially on an overall surface of said second substrate, a plurality of said conductive layers are formed on a surface of said electret member at an interval, a portion, where said conductive layers are not formed, of said electret member corresponds to said third electrode, and said conductive layers correspond to said fourth electrode, and a charge outflow inhibition film is formed on said surface of said electret member.

2. The generator according to claim 1, wherein
said first electrode includes a plurality of first electrode portions formed at an interval, and
said second electrode includes a plurality of second electrode portions formed between said first electrode portions.

3. The generator according to claim 1, wherein
said first electrode and said third electrode are opposed to each other and capacitively coupled with each other and said second electrode and said fourth electrode are opposed to each other and capacitively coupled with each other when said first electrode is located on the region opposed to said third electrode, while said second electrode is capacitively coupled with said third electrode, while said second electrode and said third electrode are opposed to each other and capacitively coupled with each other and said first electrode and said fourth electrode are opposed to each other and capacitively coupled with each other when said second electrode is located on the region opposed to said third electrode.

4. The generator according to claim 1, wherein
said conductive layer is an electrode for inhibiting a component other than a vertical component with respect to a main surface of said electret member in an electric field due to charges stored in said electret member from generation.

5. The generator according to claim 1, wherein
said third electrode includes a plurality of third electrode portions formed at an interval, and
said fourth electrode includes a plurality of fourth electrode portions formed between said third electrode portions.

6. The generator according to claim 1, further comprising a circuit portion for outputting charges induced in at least either said first electrode or said second electrode as a current, wherein
said first electrode and said second electrode are connected to each other through said circuit portion, and said first substrate is formed as a fixed substrate.

7. The generator according to claim 1, wherein a current flows to said circuit portion resulting from the potential difference between the potential of said first electrode closer to said movable substrate set by capacitive coupling with either said third electrode or said fourth electrode closer to said fixed substrate and the potential of said second electrode closer to said movable substrate set by capacitive coupling with either said third electrode or said fourth electrode closer to said fixed substrate.

8. The generator according to claim 1, wherein
said first substrate and said second substrate are so provided as to be opposed to each other at an interval and so formed as to vibrate relatively with each other and generate current by an electrostatic induction operation, such that the current is supplied to a load by said first electrode and said second electrode formed on said first substrate without a wired connection between said first substrate and said second substrate.

* * * * *